(12) United States Patent
Weiss (10) Patent No.: US 6,286,244 B1
(45) Date of Patent: Sep. 11, 2001

(54) MOLDED FISHING ROD

(75) Inventor: John Weiss, Okoboji, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 09/402,615

(22) PCT Filed: Apr. 24, 1998

(86) PCT No.: PCT/US98/08250

§ 371 Date: Dec. 28, 1999

§ 102(e) Date: Dec. 28, 1999

(87) PCT Pub. No.: WO98/48618

PCT Pub. Date: Nov. 5, 1998

Related U.S. Application Data (63) Continuation of application No. 08/840,705, filed on Apr. 25, 1997, now abandoned.

(51) Int. Cl.[7] .......................... A01K 87/00; A01K 87/04; B65H 81/00
(52) U.S. Cl. ................... 43/18.1; 43/24; 156/189
(58) Field of Search .................... 156/189, 175; 43/18.1, 24

(56) References Cited

U.S. PATENT DOCUMENTS

| | | |
|---|---|---|
| D. 261,919 | 11/1981 | Ohmura . |
| D. 271,127 | 10/1983 | Ohmura . |
| 2,602,766 | 7/1952 | Francis . |
| 3,175,323 | 3/1965 | Axelsson . |
| 3,780,684 | 12/1973 | Ohmura . |
| 3,953,637 | 4/1976 | Phillips . |
| 4,015,360 | 4/1977 | Herter . |
| 4,141,132 | 2/1979 | Ohmura . |
| 4,174,583 | 11/1979 | Ohmura . |
| 4,218,841 | 8/1980 | Gallagher et al. . |
| 4,398,369 | 8/1983 | Wiebe . |
| 4,468,270 | * 8/1984 | Green ................... 156/189 |
| 4,517,321 | 5/1985 | Gardner et al. . |
| 4,601,127 | 7/1986 | Maeda . |
| 4,703,578 | * 11/1987 | Highby . |
| 4,729,820 | 3/1988 | Mitchell . |
| 4,760,106 | 7/1988 | Gardner et al. . |
| 4,821,447 | * 4/1989 | Nakayama et al. ............ 43/18.1 |
| 4,847,063 | 7/1989 | Smith . |
| 4,858,365 | 8/1989 | Struntz . |
| 4,891,899 | 1/1990 | Wulff . |
| 4,892,764 | 1/1990 | Drain et al. . |
| 4,962,608 | 10/1990 | Loomis et al. . |
| 5,076,004 | 12/1991 | Sunaga et al. . |
| 5,076,871 | 12/1991 | Frye et al. . |
| 5,181,336 | * 1/1993 | Yasui . |
| 5,198,058 | 3/1993 | You . |
| 5,305,601 | 4/1994 | Drain et al. . |

(List continued on next page.)

FOREIGN PATENT DOCUMENTS

| | | |
|---|---|---|
| 921474 | * 3/1947 | (FR) . |
| 404365437 | * 12/1992 | (JP) . |

OTHER PUBLICATIONS

Patent Specification, "Process for the production of Epoxide Resins"; Application No. 1,024,288, Application made in Germany.

*Primary Examiner*—Charles T. Jordan
*Assistant Examiner*—Christian M. Best
(74) *Attorney, Agent, or Firm*—Roylance, Abrams, Berdo & Goodman, L.L.P.

(57) ABSTRACT

Fishing rods are molded with integral line guides or line guide stanchions for attaching conventional or only slightly modified line guides. The preferred line guides are made of metal or ceramic guide inserts in metal frames with one or two support feet. The molding process facilitates the automated manufacture of rods with line guides in proper alignment and positioning. The handle section of the blank can be molded to form an integral foregrip and/or reel seat.

20 Claims, 6 Drawing Sheets

U.S. PATENT DOCUMENTS

| | | |
|---|---|---|
| 5,320,696 | 6/1994 | McConnell et al. . |
| 5,361,529 | 11/1994 | Lindler . |
| 5,364,700 | 11/1994 | Domeier . |
| 5,419,231 | 5/1995 | Earle, III et al. . |
| 5,487,806 * | 1/1996 | Viellard . |
| 5,517,786 * | 5/1996 | Peissig ................... 43/18.1 |
| 5,534,203 | 7/1996 | Nelson et al. . |
| 5,580,626 | 12/1996 | Quigley et al. . |
| 5,599,629 | 2/1997 | Gardner et al. . |

* cited by examiner

MOLDED FISHING ROD

This application is a 371 of PCT/US98/08250, file Apr. 24, 1998 and a continuation of Ser. No. 08/840,705, filed Apr. 25, 1997 abandoned.

FIELD OF THE INVENTION

The invention relates to a composite fishing rod with integral line guides or line guide stanchions and the associated process of manufacture. The rod is made by molding a graphite fiber preform and one or more lines guides or line guide stanchions to which line guides can be attached. The molding and guide/stanchion integration process facilitates the automation of fishing rod manufacture and can allow manufacturers to eliminate the steps for securing line guides to the rod surface with threads or filaments.

BACKGROUND TECHNOLOGY

Conventional manufacture of fishing rods can be broken down into two main activities. The first is the formation of the rod blank. Typically, this is done with prepreg sheets of graphite and/or glass fibers onto a tapered, reusable mandrel. Resin transfer molding (RTM) is another possible method although the technique is generally considered to be hampered by low fiber volumes and a generally higher total manufacturing cost.

The second activity of fishing rod manufacture is the process of attaching the hardware to the blank in an aesthetically pleasing, correctly aligned manner. Such hardware includes the first line guide from the handle end (the stripping guide), the intermediate guides, the tip guide (the "tip top"), and a handle that includes: (a) a gripping section made of a material (e.g., cork, ethyl vinyl acetate, foamed or unfoamed rubber in a single or dual density, and polyurethane) that is readily gripped when wet as well as (b) a mechanical configuration that permits the reel to be held in or on the handle section (also referred to as the "reel seat").

The line guides are typically adhered to the blank surface at predetermined lengths and then secured to the blank with a cotton thread or wire wrapped over a guide foot and the outer surface of the rod. When the foot has been fully wrapped and secured to the rod, the thread is coated with a flexible, clear coating. A skilled employee can attach the guides to 2–4 rods per hour, depending on the style of the rod and the degree of detail specified. Such a manufacturing rate represents a significant cost for labor in the final cost of manufacture of a fishing rod.

It would be advantageous to have a process for making a fishing rod blank that would require less time and/or labor for adding the required line guides.

The cost for attaching the handle is somewhat better in terms of the required labor. A "blank-thru" handle design allow the rod blank to pass through the length of the handle with some portion thereof exposed for contact by the angler. The handle section (typically including a reel seat and a foregrip section in advance of the reel seat) slips over the butt end of the rod blank and is adhered to the underlying rod blank. In the assembly process, it is important that the reel seat be properly aligned with the line guides which are themselves properly aligned. The alignment process, although not necessarily time consuming, is critical to the commercial acceptability of the rod.

It would be useful to have a rod and manufacturing process that would assist in the alignment of the handle section with the line guides.

A desire to reduce labor costs is hardly a new concept. Others in the art have looked at processes to form fishing rods in a way that eliminated the manual layup and wrapping of prepreg. For example, JP 5-137,483 (A) teaches a process for making fishing rods by wrapping a cloth of thermoplastic reinforcing fibers around a mandrel. The wrapped mandrel is then inserted into a female mold and heated to a temperature sufficient to melt the fibers into a rod. The mold and mandrel are then removed.

JP 2-265,423 (A) teaches a resin injection process for molding fishing rods that forms axial grooves in the rod surface. The axial grooves are used as alignment guides for securing line guides.

U.S. Pat. No. 2,602,766 describes a process for molding tapered rods with a folded length of reinforcing fibers and an overbraid around a central mandrel in a mold.

U.S. Pat. No. 4,703,578 describes a fishing rod and manufacturing process that forms the rod blank and handle portion in the same operation. With such a formation technique, the handle material is limited to that of the rod blank although an integral construction is said to better transmit feedback vibrations to the angler.

U.S. Pat. No. 4,218,841 recognizes the labor costs associated with securing line guides to the surface of a rod blank. This '841 patent teaches a one piece fishing rod having resinous line guides molded from the surface of blank made "from a plastic material having a similar amount of rigidity or flexibility as a conventional fishing rod made of bamboo or other conventionally used material." (col. 1, lines 47–50) The blank is "potted" into a separate handle section. Unfortunately, a resinous line guide that is molded from the surface of the blank may limit the performance of the rod due to the length of the rod length devoted to the line guide.

It would be desirable to have a fishing rod manufacturing process that would allow a reduction in the amount of manufacturing labor associated with guide and handle attachment yet produce a high quality fishing rod. Preferably, the manufacturing process would facilitate the alignment accuracy when attaching the line guides and handle section to the rod blank.

In certain circumstances and for certain styles of fishing, it would be useful to have a manufacturing process that would allow the manufacture of a fishing rod of high sensitivity but in a physical shape other than a strictly linear, tapered tube. Such shapes could enhance the balance of the rod, the ease of gripping the handle or fishing rod, or the performance of the rod. Current manufacture by wrapping a solid mandrel does not facilitate the manufacture of nonlinear shapes.

It would be beneficial to have a manufacturing process that would allow the manufacture of nonlinear shapes and configurations in a fishing rod.

SUMMARY OF THE INVENTION

In accordance with these and other objectives of the invention that will become apparent from the description herein, a manufacturing process for fishing rods according to the invention includes:
(a) positioning a preform of reinforcing fibers and a plurality of metal or ceramic insert/metal frame line guides or stanchions in a mold exhibiting a tapered rod shape suitable for a fishing rod, and
(b) molding a fishing rod blank from said preform with line guides and/or stanchions integrated therein. (If stanchions are used, the process would include a later step for securing line guides to the stanchions.)

A fishing rod according to the invention is characterized by a fishing rod blank having a handle section, and a line guiding section that includes at least one metal or ceramic insert/metal frame line guide or at least one metal line guide stanchion that has been integrally molded into said rod blank. If desired, a reel seat and foregrip can be molded into or be integrated with the rod blank, associated with a later-added handle, or separately attached to the blank.

The manufacturing process of the invention and the resulting fishing rod require far less manual labor than fishing rods made with conventional processes while providing consistent alignment of high performance metal or ceramic/metal line guides. This reduces the cost of manufacture while providing a fishing rod with a consistent performance and finish.

The manufacturing process of the present invention also permits the manufacture of a fishing rod with physical shapes other than a tapered tube for a new generation of design opportunities in balance, gripping ease, and performance.

DETAILED DESCRIPTION

A fishing rod according to the invention is made by molding the rod with conventional metal or ceramic insert/metal frame line guides or metallic line guide stanchions integrated into the blank. This molding operation will allow automation for the process of manufacturing fishing rods and can eliminate the costs associated with thread or wire wrapping while providing a structurally sound, high performance fishing rod with a unique appearance. If stanchions are employed instead of integrated line guides, the stanchions would serve as positioning and attachment bases for quickly placing conventional line guides in proper alignment as well as location along the length of the rod.

If a handle is not molded into the rod blank, the rod blank can be formed to exhibit surface features that are useful for securing a later added handle in proper alignment with the line guides. The handle section of the blank may be molded to exhibit threads for an end cap, and at least one alignment rib or cross section shape that facilitates alignment of a handle grip slipped over the handle end of the rod blank. The alignment rib or cross section shape in the handle section at the butt end of the blank allows a conventional handle section (modified to include a mating groove for the alignment rib) to be installed quickly in correct alignment.

Fibrous Preform with Guides or Stanchions

The rod manufacturing process starts with reinforcing fibers in a fibrous preform. As used herein, the term "preform" is a general term that encompasses a fiber containing mat of aligned or unaligned fibers either containing a thermoset resin (also referred to as a "prepreg") or as a mat of resin-free fiber to which a resin is later added.

Suitable reinforcement fibers include aramid, boron, glass, carbon, or ultrahigh molecular weight polyolefin (preferably gel spun polyethylene) fibers in the form of braided, woven, or non-woven tubes or sheets, or random short fibers. The reinforcing fibers used to make the fibrous preform may be uncoated, coated with a thermoset resin, or coated with a thermoplastic resin. Preferably, the reinforcing fiber is in the form of a braided, tapering tube or multiple plies of conventional graphite prepreg.

In general, a braided preform is made by braiding reinforcing fibers around either a solid or inflatable mandrel in either a tube of constant diameter or with a taper. If the preform is made in the form of a constant diameter tube, a plurality of tubes can be combined in a staggered shape to build a rod blank of a tapering external diameter. In such a case, the first layer should extend the entire length of the rod and then beyond the mandrel tip to form a solid tip end. Subsequent layers are staggered in starting distance from the tip end to form a taper. The butt end can be made by braiding around or inserting a hollow tube of a length adequate to form a stiff handle section, e.g., in the range of about 15–100 cm (6"–40").

If formed as a tapering tube, commercially available braiding techniques allow for continuous braiding of tube lengths that taper. If not braided around a steel mandrel, an inflatable mandrel is inserted into the preform before or after line guide stanchions are inserted, the assembly is laid into the mold cavity, and the mandrel is inflated as resin is introduced. The inflatable mandrel may or may not be removed after curing as weight and performance requirements dictate.

Adjusting the braid tightness (number of picks per inch), angle, number of braided layers and type of central mandrel can allow the fibrous preform to be made coherent "as is". The cut ends can be taped to prevent fraying or unraveling of the braided fibers. Alternatively, a relatively low melting, compatible thermoset coating can be used to "tack" the ends of a fibrous preform together into a coherent structure that can be handled, shipped, and stored. Having such a fibrous preform subassembly allows the use of contract manufacturing and inventory controls that produces a more economical manufacturing process and reduces the overall cost of the final fishing rod.

The use of graphite prepreg is substantially similar to conventional manufacture with prepreg (i.e., prepreg is cut, wrapped around a tapered mandrel, wrapped with a heat shrink film, and cured at elevated temperature) with one notable exception unique to the present invention. Namely, the rolling table exhibits curved grooves that correspond to holes in the outermost play of prepreg. The line guides to be incorporated into the blank are positioned through the prepreg holes so that, when the final ply is wrapped on an inflatable mandrel, the guides extend above the rod surface, out of the mold, and in proper alignment. The line guide is trapped by the outermost ply so that contact between an outermost play of the reinforcing fibers and a foot on the line guide secure the guides in position within the mold.

Line guides or stanchions for them can be added into or onto the fibrous preform during its formation, after formed, or after being placed in the rod mold. Preferably, the guides or stanchions are secured within the fibrous structure of the material used as the structural base of the blank. The ply or plies used to secure the guide foot within the rod structure may be the same or different as preceding or succeeding plies of preform.

The metallic stanchions for attaching line guides to the rod can take a number of shapes and configurations although each should allow conventional stripping and intermediate line guides to be secured to the rod in the proper alignment and at the proper locations. Bent metal or metal foil shapes can be used.

Preferred stanchion configurations include short posts, stubs, pots, flat metal surfaces, and virtually any mechanical configuration that allows a conventional line guide with one or two "feet" (e.g., those shown in U.S. Pat. Nos. 3,780,684; 4,141,132; 4,174,583; DES 237,175; DES 247,505; DES 261,918; DES 261,919; and DES 271,127) to be secured to the rod surface. Depending on the particular design and attachment scheme for the line guide stanchions, the "foot" or "feet" on the conventional line guides may need to be slightly modified for attachment to the stanchions. The foot section or section may be shortened, lengthened, widened, narrowed, or require a hole made therein for an adequate connection. Nonetheless, the actual line guiding surfaces should not require modification for use in the present invention.

The use of line guide stanchions for attaching conventional stripping and intermediate line guides as purchased or with slight modification is preferable to rods that have guide surfaces formed during the molding operation or which require a unique mold for each type of line guide that might be used on a rod. The reasons are several. Primarily, conventional line guides have matured in the applied technology and use materials as well as structures that are highly effective at performing their functions with good durability and little effect on the flexibility of the rod. Guide styles may be mixed on the same rod, depending on the function and fishing style contemplated for the rod. Conventional line guides and their components are also manufactured in sufficient quantities to recognize significant economies of scale.

Instead of or in addition to a stanchion, conventional metal (e.g., a bent wire or hoop with or without low friction organic or inorganic coatings) or ceramic insert/metal frame line guides (FIGS. 12 and 13) with one or two attachment feet can be integrated into the rod blank according to the invention. The preferred embodiment where at least one foot of such a line guide is secured between plies of fibrous preform is discussed above. The guide foot can, however, be secured at virtually any level or position within the rod structure where there is adequate integrity to hold the metal foot of the line guide in position within the resinous matrix or between succeeding plies of fibrous preform.

The tip end guide (the "tip top") will be adhered to the rod tip in accordance with the conventional practice after the blank is cured, removed from the mold, and sanded to remove any mold closure seams.

The molding process is preferably performed in accordance with U.S. Pat. No. 5,534,203 which disclosure is herein incorporated by reference. Briefly described, the molding process employs an inflatable mandrel that holds the fibrous preform in position and urges the preform against the outer walls of a rigid mold cavity when the mandrel is inflated. Whether prepreg composite is used as the preform or resin is separately transferred into the mold by injection or other technique, the mandrel holds the prepreg against the mold cavity walls as heat is applied to soften and cure the resin. The rough rod blank is removed from the mold when the thermoset resin has cured sufficiently to provide structural integrity. The precise curing time will depend on the type and nature of the resin used but is well within the existing level of skill in the art to determine with no more than routine experimentation.

Those in the art will recognize that suitable rod molds will incorporate openings for the line guides and a variety of techniques or devices can be employed to prevent resin introduced into the mold cavity from clogging the line guides and/or complicating further finishing operations. Suitable techniques and devices for limiting resin excursion include removable coatings, packing agents, molds with sealants or sealed openings for the line guides, etc. In a rod molding process, line guides having one or two guide feet are preferably covered with an elastomer coating to protect the line guide opening and limit resin excursion outside the mold.

The mold will have a shape suitable for a fishing rod including a relatively inflexible handle section and a flexible line guiding section. The last section, the guiding section, is where the stripping guide, the intermediate guides, and the tip top guide are located and whose performance is responsible for casting, retrieving, and fighting a hooked fish.

The handle of a fishing rod is a relatively inflexible section that must form a smooth connection to the line guide section without introducing stress points or possible fracture lines that would weaken to failure as the rod is used. The handle usually includes a gripping section, a reel seat that is responsible for providing a releasable mechanical connection for a fishing reel, and may also include a foregrip in front of the reel seat. The reel seat must be generally aligned with the path of the line guides to minimize friction during a cast to maximize casting distance.

A molded handle is preferred with composite handle sections containing shaped pieces of cork, ethyl vinyl acetate, foamed or unfoamed rubber in a single or dual density, and polyurethane that can be readily gripped when wet. Such shaped pieces can be included in the mold for integral formation with the rod blank.

If a molded handle is not integrally formed, the mold can also be formed to have at least one rib or other mechanical configuration in the butt end for facilitating the alignment of a separate handle section later slipped over the butt end of the molded rod. The terminus of the butt end may also have molded threads to secure a butt cap onto the butt end of the blank.

The handle section of the blank can also be formed with an integral foregrip, reel seat, and reel seat nut threads. An integral foregrip is preferably a separately added fibrous cone wrapped around the preform and co-cured in the molding step to make an integral foregrip that will efficiently transmit vibrational energy from the rod for an increased level of feedback when fishing. An integral reel seat and reel seat nut threads allow the reel seat to be molded in proper alignment with the line guides and also permit the use of a handle grip that can be readily installed without concern for alignment.

When a separate handle section having a reel seat is used in a blank-thru design (one where the rod blank extends below the reel seat section and into the handle grip), the butt end of the fishing rod can be formed to exhibit a noncircular shape, guide fins, transverse openings, or some other moldable configuration that will allow a mating configuration in the handle when a discrete handle is slid over the butt end of the rod into alignment between the reel seat and the path of the line guides to be installed on the rod. Suitable alignment configurations for the butt end of the rod include noncircular cross section shapes (e.g., triangular, rectangular, square, pentagonal, and hexagonal), one or more alignment ridges on the blank surface (e.g., 1–12, preferably 1–8, and most preferably 1–6 surface ridges), one or more alignment grooves in the blank surface, transverse openings that will align with a corresponding opening in the handle, and combinations of these. The preferred configurations include geometric cross sectional shapes and at least one alignment ridge made from resin.

The terminus of the butt end of the rod may be open, filled, threaded, or otherwise shaped to mate with a cap for the butt end of the fishing rod. The precise choice of how to terminate the fishing rod will depend on the specific details of the handle design.

If the blank is molded to have an integral reel seat and appropriate nut threads, there is a reduced need for concern over alignment with the handle grip. The butt end of the blank may have merely a generally round exterior shape, and the handle grip can exhibit a symmetrical shape (e.g., round, rounded corner rectangle, etc.) with a generally round central bore sized to slip over the butt end of the blank. Adhesive is used to secure the handle in position.

The specific performance requirements for the line guiding section fall within ranges of static and dynamic characteristics that are well known to those in the art. As such, no further elaboration is presented herein on performance except to say that modifications in the static and dynamic characteristics of the line guiding section can be made by changes to the nature of the fibers, the orientation of the fibers within the preform, the presence or absence of scrim layers, and the tightness of any braiding as well as any braid angle used in the preform. Line guide and/or stanchion designs are preferably chosen so that the presence of the guides or stanchions has as little influence as possible on the dynamic performance of the line guide section of the rod.

Where a resin-free fibrous preform is used, resin is introduced into the mold when the fibrous preform, all line guides or stanchions, and any handle materials have been positioned in the mold. Any of the conventional techniques for introducing resin into the mold cavity can be used.

Suitable resins for introduction into the mold or for use in the prepreg include those conventionally used for hollow rods made with graphite, glass, aramid, or other reinforcing fibers. See, U.S. Pat. No. 4,778,716 which is herein incorporated by reference.

Suitable resins cure to a finish that is clear, durable, damage tolerant, and able to withstand repeated, high deflection flexure. Particularly preferred resins are those with a glass transition temperature of at least 140° F. (most preferably within the range of about 160°–350° F.) and a short beam shear strength of at least 7,000 psi (more preferably at least 11,000 psi). In general, the resins used for fishing rods represents about 40–70% of the rod weight.

Thermoset resins made of epoxy are generally preferred. Especially preferred epoxies are those having more than one functional group in the molecule. The matrix of the present invention is prepared by mixing a polyfunctional epoxide compound or compounds (prepolymer or prepolymers) with a suitable curing agent, such as an amine-functional, and preferably polyfunctional curing agent. Conventional ratios can be used, for example, 1 epoxide equivalent to 0.3 to 3.0 NH-equivalents, preferable 1.0 to 3.0 NH-equivalents, and especially preferably 1.5 to 2.5 HN-equivalents, optionally with heating.

The epoxy prepolymers include, but are not limited to, polyglycidyl ethers of polyvalent phenols, for example, pyrocathechol; resorcinol; hydroquinone; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulphone; or tris-(4-hydroxyphenyl)methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol of a dihalogen alkane or dihalogen dialkyl ether (See U.K. Pat. No. 1,107,612); and polyglycidyl ethers of polyphenols obtained by condensing phenols and long-chain halogen paraffins containing at least 2 halogen atoms (See U.K. Pat. No. 1,024,288).

Other suitable compounds include polyepoxy compounds based on aromatic amines and epichlorohydrin, for example, N,N'-diglycidyl-aniline; N,N'-dimethyl-N,N'-diglycidyl-4,4'-diaminodiphenyl methane; N,N,N',N'-tetraglycidyl-4,4-diaminodiphenyl methane; and N-diglycidyl-4-aminophenyl glycidyl ether. Special mention is made of N,N,N',N'-tetraglycidyl-1,3-propylene bis-4-aminobenzoate.

Glycidyl esters and/or epoxycyclohexyl esters of aromatic, aliphatic and cycloaliphatic polycarboxylic acids, for example, phthalic acid diglycidyl ester and adipic ester diglydicyl and glydicyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example, of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyltrimethylene sulphone, are also suitable as well as virtually any other thermoset resin system that will form a good bond with graphite fibers.

Introduction of the resin may be made in a variety of ways. Particularly preferred techniques include resin transfer molding (RTM), reaction injection molding (RIM), and reinforced reaction injection molding (RRIM). RTM is a molding process wherein a reinforcing fiber is positioned within a mold into which a thermoset resin is introduced. A feed line connects the closed molding tool cavity with a supply of liquid resin and the resin is pumped or otherwise transferred into the tool cavity where it impregnates and envelops the fiber reinforcement, and subsequently cures. Heating the mold can accelerate the curing. The cured or semi-cured fiber-reinforced plastic product is then removed from the molding cavity. Minor surface finishing may be required to remove any split line left from the mold.

RIM is a molding process in which reactable components are maintained apart, and are mixed only moments before being introduced into the mold cavity. RRIM is similar to RIM except that short, chopped reinforcing fibers can be introduced with one of the reactant components to provide dispersed reinforcement. The chopped reinforcing fibers used in RRIM may be chemically or aesthetically the same or different than the fibers used in the fibrous preform.

It is contemplated that a final, clear coating of resin will be used to form a finished, saleable surface to the rod. Such coatings are conventionally applied with some form of squeegee or spray device. For this reason, the guide stanchions preferably expose a connectable surface but do not protrude more than about 3–4 mm (120–160 mil), more preferably not more than about 2 mm, above the rod surface as removed from the mold, i.e., after resin infiltration and curing. It is anticipated that any finishing necessary to remove mold lines will be minimal and will not significantly alter the height of the molded surface although appropriate modifications can be made for molding and finishing process steps that require significant material removal.

The invention is conveniently described with reference to the attached figures.

Figure 1:
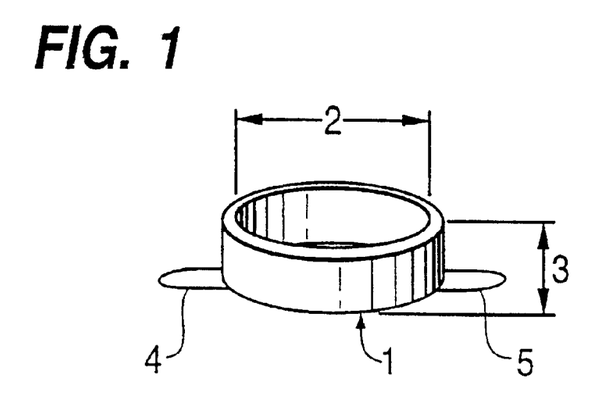
FIGS. 1 and 2 show two types of metal line guide stanchions that can be integrated into the rod according to the invention.
Figure 2:
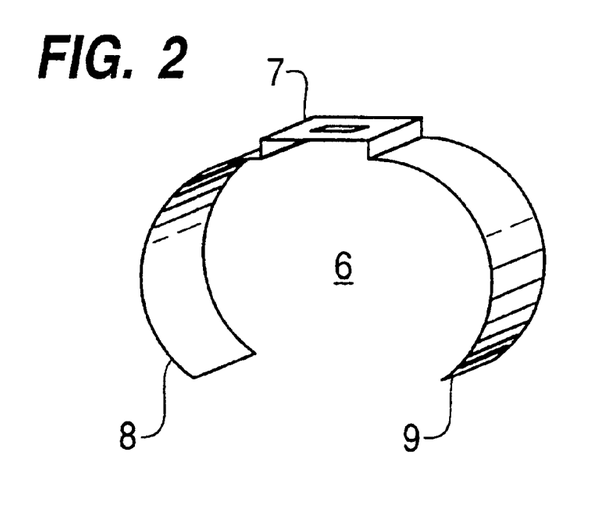

FIGS. 1 and 2 show a short walled metallic stanchion 1 into which a single footed line guide (not shown) can be secured within the length 2 thereof. The wall height 3 is sufficiently short that it does not interfere with a squeegee coater used to apply a final clearcoat to the finished rod. A pair of protrusions 4, 5 on either side of short walled stanchion 1 assist in securing the stanchion inside the fibrous preform during the molding operation.

Clip stanchion 6 is made from flat metal to present a flat surface platform 7 to which a line guide foot can be soldered, brazed, or adhered. Lateral extensions 8, 9 fit between an internal mandrel (solid or inflatable) and the inner surface of a braided fibrous preform.

Figure 3:
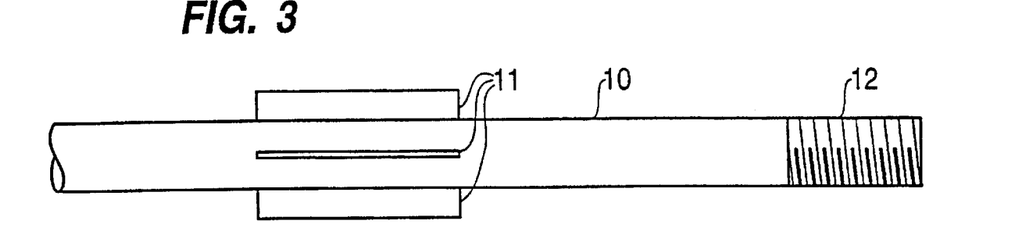
FIGS. 3–8 illustrate mechanical configurations of the rod butt end that facilitate alignment of a discrete handle grip slipped over the butt end.

FIG. 3 depicts the butt end of a fishing rod blank 10 with a plurality of alignment ridges 11 and a threaded butt end 12. A handle (not shown) with grooves corresponding to the number and location of alignment ridges 11 is slid over blank 10 and adhered in position. A corresponding threaded butt cap is screwed onto butt end threads 12 to hold the handle in position while the adhesive cures as well as serving as a shock absorber for axial impacts.

Figures 4, 5:
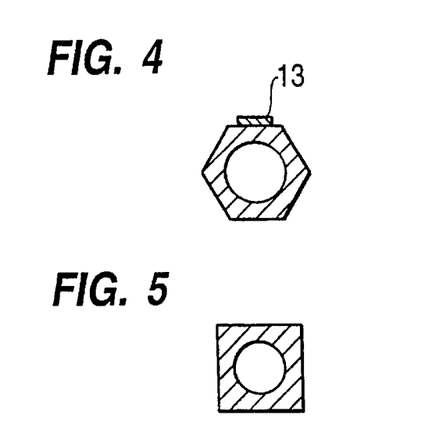
Figure 6:
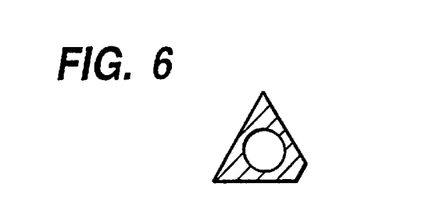

FIGS. 4–6 show other molded butt end configurations that facilitate the alignment between the handle reel seat and the path of the line guides. FIG. 4 shows a butt end blank configuration with a hexagonal external cross section and an alignment rib 13. FIG. 5 exhibits a square cross sectional shape without a surface rib. FIG. 6 shows a triangular shape with a truncated edge to engage the handle in only one orientation.

Figure 7:
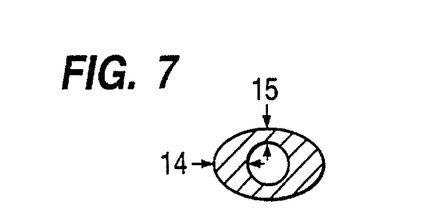
Figure 8:
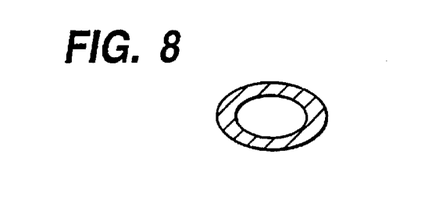

FIGS. 7 and 8 depict an oval exterior cross section. The embodiment of FIG. 7 would be made with a solid mandrel that gives a thicker wall in one direction 14 than the transverse direction 15. The use of an inflatable mandrel, as in FIG. 8, permits the wall thickness to remain substantially uniform.

In general, the cross sectional shape of the hollow center of the fishing rod will be circular, following the shape of a circular solid (metal or fiberglass) or inflatable mandrel used to form the fibrous preform. The mandrel can be allowed to remain in the preform through the molding step and subsequently removed, allowed to remain within the blank indefinitely, or the mandrel can be made of a sacrificial material that is degraded for removal.

Figure 9:
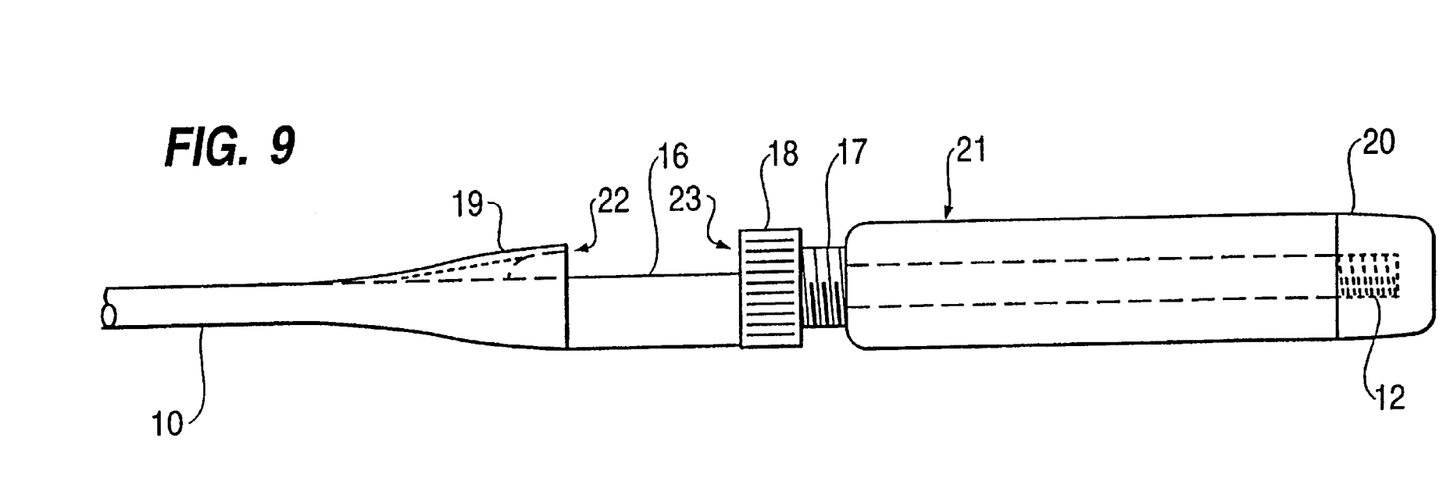
FIG. 9 depicts a butt end having a foregrip, reel seat, and end cap threads molded into the fishing rod blank.
Figure 10:
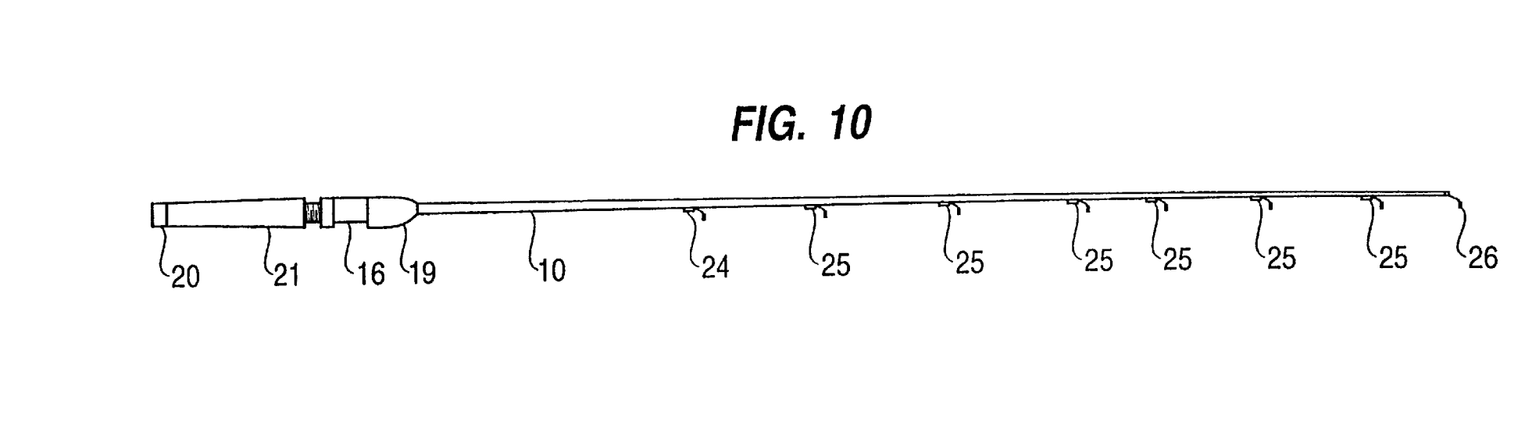
FIG. 10 is a sketch of a fishing rod having integral line guide stanchions for attaching stripper and intermediate line guides.
Figure 11:
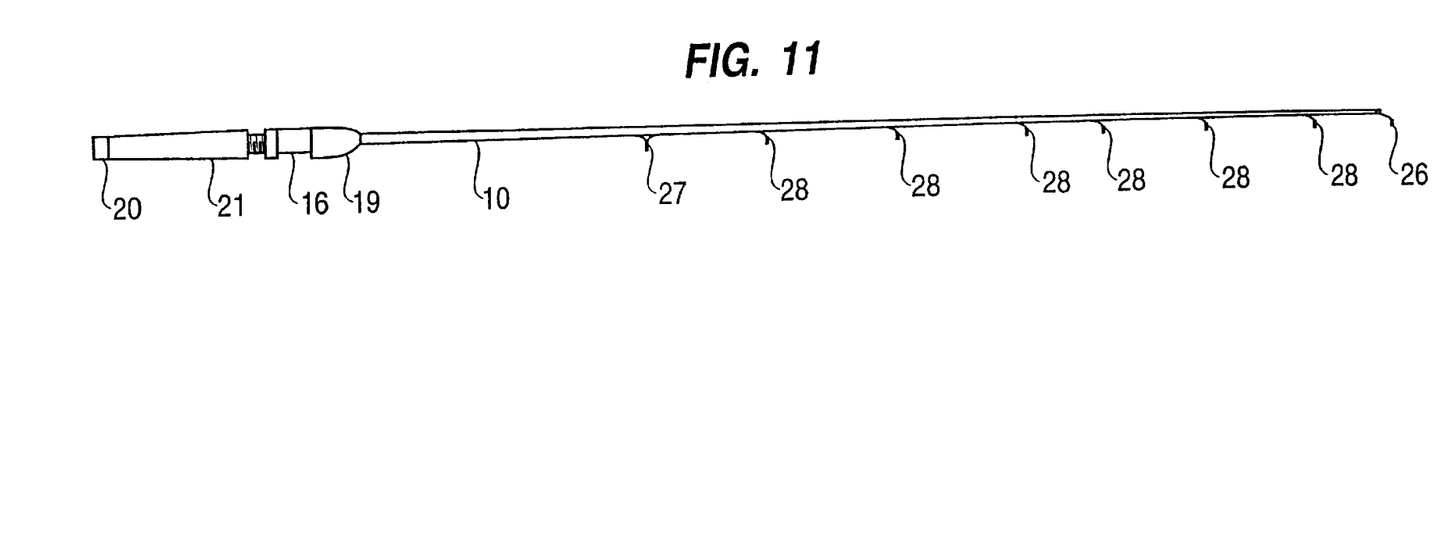
FIG. 11 shows a fishing rod having integral line guide stanchions for attaching stripper and intermediate line guides.

FIGS. 9–11 illustrate a fishing rod with reel seat 16, reel seat nut threads 17 for nut 18, and foregrip 19 molded to be integral with blank 10. Threaded butt cap 20 is screwed onto butt end threads 12. The alignment of handle grip 21 is thus made less critical so that grip 21 can be slipped over blank 10 without the need for alignment devices and secured with butt cap 20.

Foregrip 19 will be shaped to provide a cavity 22 into which the leading foot of a reel (not shown) may be placed. Pressure applied by advancing nut 18 will urge the reel feet into reel seat cavities 22, 23 and provide a releasable connection for the reel in reel seat 16.

At a distance from foregrip 19 in FIG. 10 is first line guide stanchion 24 attached to a conventional line guide (commonly referred to as the "stripper guide") followed by a plurality of intermediate stanchion/line guide combinations 25, and terminating in tip line guide 26 (the "tip top"). A similar arrangement is shown in FIG. 11 but with a conventional metal, double footed stripper guide 27 and single-footed line guides 28 that are secured between successive fibrous preform plies of rod 10.

Figure 12:
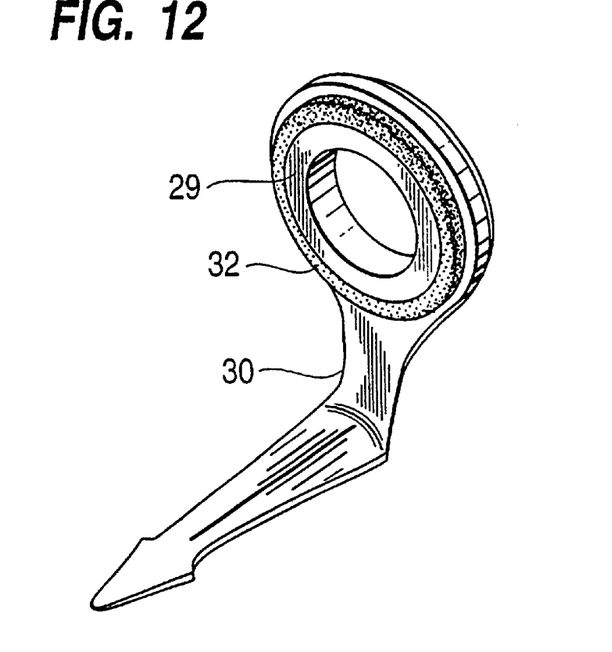
FIGS. 12 and 13 illustrate single and double-footed ceramic insert/metal frame line guides of the type that can be molded into the fishing rod blanks according to the invention.
Figure 13:
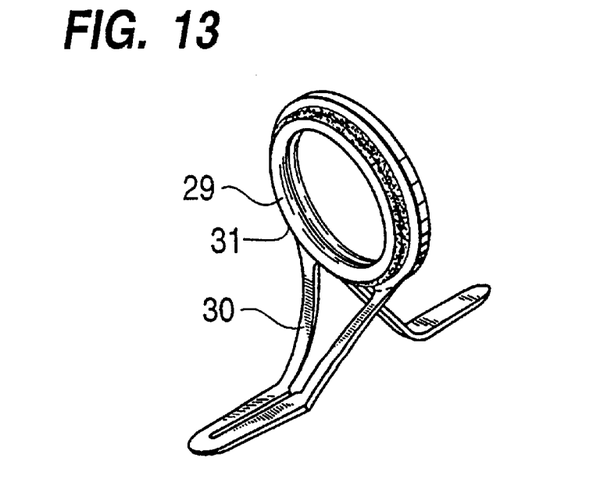

FIGS. 12 and 13 illustrate conventional single and double-footed ceramic insert/metal frame line guides that can be incorporated into the fishing rods of the invention. In such guides, ceramic insert 29 is held in metal frame 30 by a lip 31 formed from insert 29 or elastomeric grommet 32. Such line guides are commercially referred to as "ceramic guides" and available from a number of commercial sources in a number of configurations.

Due to the unique nature of the present invention, however, discrete (i.e., chemically and physically different from the rod blank composite material) line guide frames of virtually any metal, fibrous composite, ceramic, or otherwise sufficiently low friction guiding surface of durable material can be integrated directly into the rod or via an intermediate attachment stanchion.

It will be understood that the illustrations are supplied for the purposes of assisting in an explanation of the invention and are not intended to act as a limitation on the scope of the appended claims.

What is claimed is:

1. A process for making a fishing rod having a tip end and a butt end with integral line guides or line guide stanchions, said process comprising the steps:

(a) positioning a preform of reinforcing fibers and a plurality of metal or ceramic insert/metal frame line guides or metal stanchions in a mold exhibiting a tapered rod shape suitable for a fishing rod; and (b) molding said preform into a fishing rod blank with said line guides or stanchions being integral therewith.

2. A process according to claim 1 wherein said reinforcing fibers are selected from the group consisting of aramid, graphite, glass, gel spun polyethylene, and mixtures thereof.

3. A process according to claim 1 wherein said reinforcing fibers are in the form of a braid, a yarn, weave, or nonwoven wrapping.

4. A process according to claim 1 wherein said reinforcing fibers are in the form of a braid.

5. A process according to claim 1 wherein the molding step includes urging said preform against a mold cavity wall by inflating an inflatable mandrel within said preform.

6. A process according to claim 1 wherein said preform is made of plies of prepreg composite.

7. A process according to claim 1 wherein lines guides are positioned within said mold and secured in position by contact between a foot on said line guide and an outermost ply of said reinforcing fibers.

8. A process according to claim 1 wherein line guide stanchions are positioned in said mold and line guides are secured to said stanchions after the rod blank has been molded.

9. A molded fishing rod having a handle section and a line guiding section, said rod comprising:

a fishing rod blank made with a composite of reinforcing fibers in a cured resin, said blank having a handle section exhibiting an alignment-directing configuration, and a line guiding section with a stripper line guide stanchion and a plurality of line guide stanchions over the length of said blank in a line guiding alignment, wherein said stanchions are each molded into and secured within the fibrous structure of the cured composite, a plurality of line guides, each exhibiting a foot section and a guide frame surface made of either a ceramic insert within a metal frame or a chromium-coated metal, wherein each line guide is secured to a stanchion by its foot section, and a handle comprising a gripping portion and a reel seat in alignment with said line guides.

10. A fishing rod according to claim 9 wherein said line guides include lines guides that comprise a ceramic insert within a metal frame.

11. A fishing rod according to claim 9 wherein said line guides include lines guides that comprise chromium-coated metal line guides.

12. A fishing rod according to claim 9 wherein said handle section exhibits a noncircular cross sectional shape.

13. A molded fishing rod having a handle section and a line guiding section, said rod comprising a fishing rod blank made from a composite of reinforcing fibers in a resin, said rod blank including:

(a) a handle section at a butt end of said rod and exhibiting an integral reel seat and an integral foregrip, and (b) a line guiding section with an integral stripper line guide of a different material than said composite that is secured by fibers within said composite and a plurality of intermediate line guides of a different material than said composite that is molded within said composite and secured by fibers therein, each of said line guides in a line guiding alignment.

14. A fishing rod according to claim 13 wherein fiber reinforced composite is made with a fibrous preform that includes a tube of braided reinforcing fibers having line guides inserted therein.

15. A fishing rod according to claim 13 wherein said intermediate line guides comprise a ceramic insert within a metal frame.

16. A fishing rod according to claim 13 wherein said intermediate line guides comprise chromium-coated metal line guides.

17. A molded fishing rod blank which includes:

(a) reinforcing fibers in a cured thermoset resin molded in the shape of a fishing rod blank having a handle section and a line guiding section, wherein the handle section of said blank exhibits an alignment-directing configuration, and (b) a plurality of metal line guides or ceramic insert/metal frame line guides disposed in said line guiding section and integrally secured by said fibers within said composite.

18. A fishing rod according to claim 17 wherein the alignment-directing configuration of said blank includes a noncircular cross section.

19. A fishing rod according to claim 17 wherein said line guides comprise a ceramic insert within a metal frame.

20. A fishing rod according to claim 17 wherein said line guides comprise chromium-coated metal line guides.

* * * * *